Sept. 22, 1925.

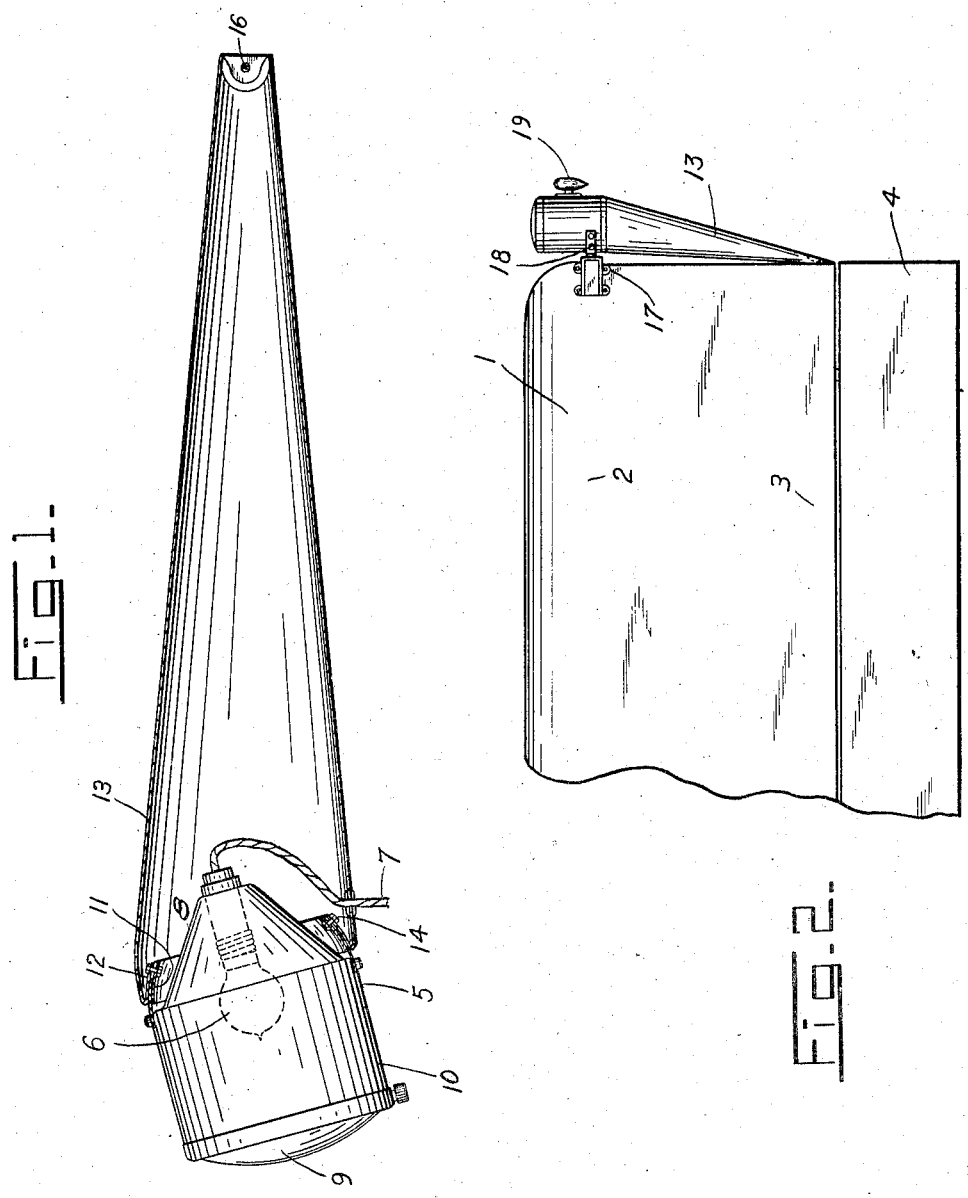

D. L. BRUNER 1,554,198

NIGHT LANDING LIGHT FOR AIRCRAFT

Filed May 29, 1923   2 Sheets-Sheet 2

INVENTOR
Donald L. Bruner
BY
ATTORNEY

Patented Sept. 22, 1925.

1,554,198

UNITED STATES PATENT OFFICE.

DONALD L. BRUNER, OF DAYTON, OHIO.

NIGHT LANDING LIGHT FOR AIRCRAFT.

Application filed May 29, 1923. Serial No. 642,234.

*To all whom it may concern:*

Be it known that I, DONALD L. BRUNER, a citizen of the United States, residing at Dayton, in the county of Montgomery and State of Ohio, have invented certain new and useful Improvements in Night Landing Lights for Aircraft, of which the following is a specification.

This invention relates to an improved night landing light for aircraft; and one object of the invention is to provide a light of this character which may be streamlined into the wing tip in order to decrease the wind resistance of the light and to decrease the aerodynamic losses at the wing tip. Other objects will be more fully set forth and described in the attached specification and claims.

In the drawings

Fig. 1 is a longitudinal vertical section thru the landing light.

Fig. 2 is a top plan view of the light showing its position on the wing.

Figure 3:
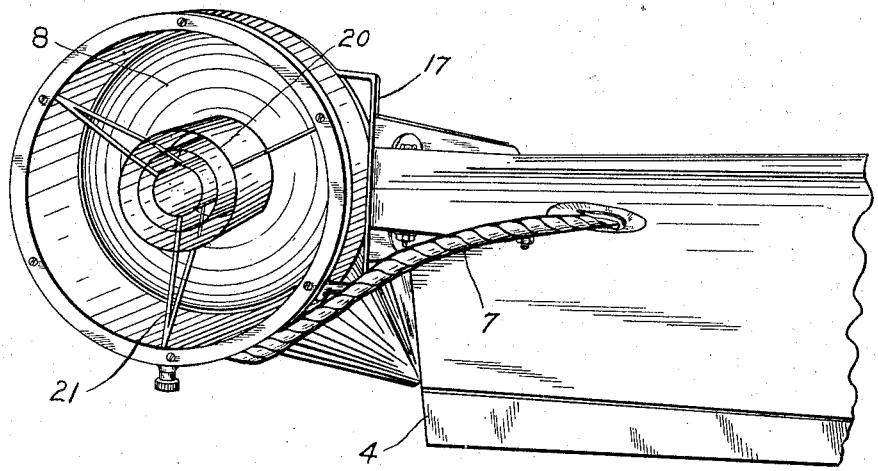
Fig. 3 is the perspective view looking at the front of the light.
Figure 4:
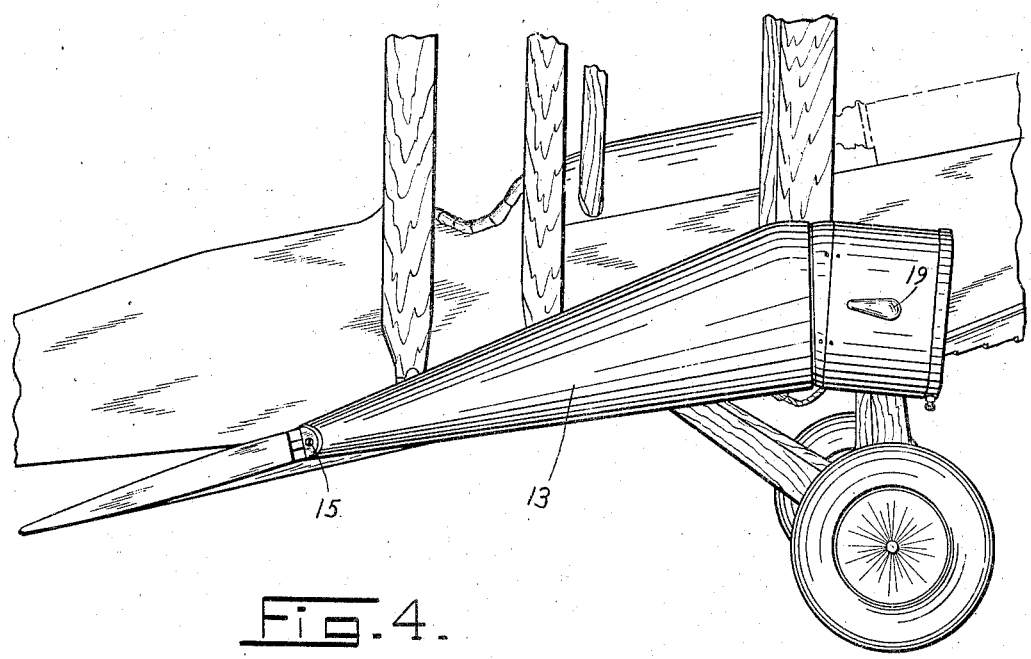
Fig. 4 is a side elevation view of the light as mounted upon an airplane wing.

Referring to the different parts by reference numerals, 1 indicates the wing of an airplane having wing beams or spars 2 and 3, and the usual aileron 4. Upon the outer portion of the wing is mounted a landing light designated generally by the numeral 5 and consisting of the bulb 6 connected by electrical cable 7 to the electrical system of the airplane. The customary reflector 8, lens 9, and lens supporting housing 10 are provided. This housing is provided with a segmental spherical strip formed as a continuation to the rear of the same, this strip being designated by the numeral 11. Concentric with this strip 11 is a second strip 12 having the same radius as the strip 11 and being formed as an integral part of the streamlined rearward continuation 13. Strips 12 and 11 are provided with a row of holes so that the two strips may be connected together by the bolts 14 and the position of the forward part of the lamp readily adjusted by adjusting the position of the bolts 14, the holes in one of the strips being slotted to provide for the vertical adjustment of the lamp.

The streamlined continuation 13 is adapted to be connected to the wing beams at the wing tip by means of a bolt 15 which extends thru the hole 16 at the rear end of the casing for attachment to the end of the rear wing beam. A bracket 17 is attached to the forward wing beam so as to be adjustable and is attached to the forward part of the lamp by bolts 18. At the side of the forward part of the lamp is a navigation light 19 of a suitable red or green color, which is connected to the cord 7 so as to obtain its power from the electrical system of the airplane.

It will be seen that the combined length of the casing 13 and the forward lamp portion 10 is substantially equal to the fixed portion of the wing tip and that the vertical height of the lamp is several times the vertical height of the wing section at the wing tip as shown in Fig. 3. The location of the light at the wing tip greatly decreases the aerodynamic losses; as the air is prevented from flowing out laterally as is the usual circumstance. The light, therefore, instead of resulting in an extra wind resistance, as would naturally be expected, improves the wing efficiency to a considerable extent by its position horizontally aligned with the wing tip.

A light of the construction described may be readily attached to any existing airplane wing without making any radical changes in the plane, and such light may be readily adjusted for its correct position according to the desires of the pilot, so as to throw its light downwardly at the proper divergence, or if desired, the light may be directed straight-forwardly, and the pilot can tell how close he is to the ground by the size of illuminated spots ahead of him. The proper angle of the light in the ordinary arrangement would be to have it pointing several degrees downwardly with the airplane at its landing position in the air so as to illuminate the ground upon which the plane will land.

The light is shown as provided with a series of cylindrical rings 20 suitably supported by brace members 21 from the casing 10. These rings which are constructed of any suitable non-reflecting material prevent the light from the bulb from being thrown out angularly to any desired extent, that is, the rays of the light may be all thrown out within fifteen degrees inclosed angle by the suitable design and length of these rings. The location of the light upon the wing tip is an especially desirable one as in that position no light is thrown on the propeller or other airplane parts. The reflection of light from which would interfere to a considerable extent with a pilot's vision while landing the airplane.

I claim:

1. A landing light for airplanes, comprising a lamp, a casing, means for mounting said casing on the outer end of the wing tip, said casing formed with a tapering tail portion to streamline the lamp into the wing tip, said casing and lamp together having a length substantially equal to the fixed portion of the wing tip.

2. A landing light for airplanes comprising a lamp, a casing, means for mounting said casing on the outer end of the wig tip, said casing formed with a tapering tail portion to streamline the lamp into the wing tip, said lamp and the large portion of the casing having a vertical extent substantially greater than the vertical height of the wing tip to decrease the aerodynamic losses at the wing tip.

3. A landing light for aircraft adapted to be detachably connected to a conventional wing tip comprising a lamp, a streamline continuation for the lamp, means for adjustably mounting said lamp in said continuation to permit angular adjustment of the light rays, means for attaching said landing light to a wing spar, and a small riding or navigation light mounted on the side of the lamp.

4. A landing light for aircraft adapted to be detachably connected to a conventional aircraft part comprising a barrel shaped lamp, a conical continuation for the lamp shaped to streamline the lamp into the aircraft part, means for adjustably mounting said lamp in said continuation, and means for attaching or detaching said continuation to the aircraft part, said first means comprising a segmental spherical strip on the front end of said continuation, a smaller segmental spherical strip on the lamp and means for clamping said strips together.

5. A landing light for aircraft adapted to be detachably connected to the end of a conventional wing tip comprising a lamp, a streamline continuation for the lamp, means for adjustably mounting said lamp in said continuation comprising a segmental spherical strip on said continuation, a mating strip on said lamp, and means for clamping said strips together.

6. A landing light for aircraft adapted to be detachably connected to the end of a conventional wing tip comprising a lamp, a casing, means for mounting said casing on the wing spar of an aircraft wing, said casing formed with a tapering tail portion to streamline the lamp into the wing tip, said casing and lamp together having a length substantially equal to the fixed portion of the wing tip, the large portion of the casing and the lamp having a vertical height larger than the vertical height of the wing tip, and means for adjustably mounting said lamp on said casing.

7. A landing light for aircraft adapted to be detachably connected to the end of a conventional wing tip of an airplane, comprising a lamp, a casing, a series of concentric rings within said lamp for deflecting the light rays forwardly, means for mounting said casing on a wing spar, said casing being formed with a tapering tail portion to streamline the lamp into the wing tip, said casing and lamp together having a length substantially equal to the fixed portion of the wing tip, the front portion of the lamp being substantially aligned with the leading edge of the wing, the large portion of the casing and the lamp having a vertical height substantially larger than the vertical height of the wing tip, and means for adjustably mounting said lamp relatively to said casing, said last means comprising a segmental spherical strip on said casing, a mating strip on said lamp, and means for clamping said strips together.

In testimony whereof I affix my signature.

DONALD L. BRUNER.